United States Patent

Misawa

[11] Patent Number: 6,070,020
[45] Date of Patent: May 30, 2000

[54] SELECT DIAL HAVING A CLICK-STOP MECHANISM FOR A CAMERA

[75] Inventor: Masayuki Misawa, Tokyo, Japan

[73] Assignee: Ashai Kogaku Kogyo Kabushiki Kaisha, Tokyo, Japan

[21] Appl. No.: 09/294,199

[22] Filed: Apr. 20, 1999

[30] Foreign Application Priority Data

Feb. 21, 1998 [JP] Japan .................................. 10-110945

[51] Int. Cl.[7] .................................................. G03B 17/00
[52] U.S. Cl. .......................................... 396/299; 396/297
[58] Field of Search .................................. 396/299, 297, 396/298; 116/213

[56] References Cited

U.S. PATENT DOCUMENTS

| | | | |
|---|---|---|---|
| 4,165,164 | 8/1979 | Akasaka | 396/299 |
| 4,173,404 | 11/1979 | Akasaka | 396/299 |
| 4,307,953 | 12/1981 | Yamamoto et al. | 396/299 |
| 4,405,222 | 9/1983 | Yamamoto et al. | 396/299 |
| 4,408,499 | 10/1983 | Haneishi | 396/298 |
| 5,752,117 | 5/1998 | Hori . | |

*Primary Examiner*—Russell Adams
*Attorney, Agent, or Firm*—Greenblum & Bernstein, P.L.C.

[57] ABSTRACT

Disclosed is a select dial of a camera which includes a rotatable member and a click-stop mechanism for making the rotatable member stop with a click at any one of a plurality of click-stop positions of the rotatable member when the rotatable member is rotated. The click-stop mechanism includes: a positioning member having a plurality of holes which determine the plurality of click-stop positions; and a plurality of balls each being pressed against the positioning member to be engageable with any one of the plurality of holes. The plurality of holes and the plurality of balls are arranged so that one of the plurality of balls is disengaged from any of the plurality of holes when another ball of the plurality of balls is engaged with any one of the plurality of holes.

21 Claims, 4 Drawing Sheets

SELECT DIAL HAVING A CLICK-STOP MECHANISM FOR A CAMERA

BACKGROUND OF THE INVENTION

1. Field of the Invention

The present invention relates to a select dial of a camera which is provided with a click-stop mechanism wherein the select dial rotates stepwise.

2. Description of the Related Art

A select dial provided on a camera for selecting, e.g., a desired shutter speed among a predetermined number of shutter speeds is well-known. Such a select dial is generally provided with a click-stop mechanism wherein the select dial rotates stepwise. With the click-stop mechanism, the rotational angle of each step of the select dial is determined by a plurality of predetermined click-stop positions. A click-stop mechanism for such a select dial which is provided with a plurality of engaging holes arranged on a common circumference and a click ball engaged with any one of the plurality of engaging holes is known in art. In this type of click-stop mechanism, the number of click-stop positions of the select dial are identical to the number of the engaging holes. Therefore, to increase the number of click-stop positions of the select dial, only the number of engaging holes has to be increased.

However, since the plurality of engaging holes are generally arranged at regular intervals on a common circumference about the rotational center of the select dial, in order to increase the number of engaging holes it is necessary to increase the radius of the circumference, which requires the select dial to have a large diameter.

Therefore, the select dial needs to be large and consumes a large space on the camera body, which is not desirable for a compact camera design.

SUMMARY OF THE INVENTION

An object of the present invention is to provide a select dial having a click-stop mechanism which makes it possible to have a large number of click-stop positions without increasing the diameter of the select dial.

To achieve the object mentioned above, according to an aspect of the present invention, there is provided a select dial of a camera which includes a rotatable member and a click-stop mechanism for making the rotatable member stop with a click at any one of a plurality of click-stop positions of the rotatable member when the rotatable member is rotated. The click-stop mechanism includes: a positioning member having a plurality of holes which determine the plurality of click-stop positions; and a plurality of balls each being pressed against the positioning member to be engageable with any one of the plurality of holes, wherein the plurality of holes and the plurality of balls are arranged so that one of the plurality of balls is disengaged from any of the plurality of holes when another ball of the plurality of balls is engaged with any one of the plurality of holes.

Preferably, the rotatable member is rotatable about a shaft supported by a stationary member of a camera body. Preferably, the shaft is integrally formed with the rotatable member.

The positioning member can be fixed to the rotatable member. The positioning member can be integrally formed with the rotatable member.

The positioning member can be fixed to the stationary member. The positioning member can be integrally formed with the stationary member.

Preferably, the plurality of holes are positioned on a first circumference about a rotational center of the rotatable member. In this case, the plurality of balls are preferably positioned on the stationary member to be engageable with any one of the plurality of holes in the case where the positioning member is fixed to the rotatable member, or the plurality of balls are preferably positioned on the rotatable member to be engageable with any one of the plurality of holes in the case where the positioning member is fixed to the stationary member.

Preferably, the plurality of balls are positioned on a second circumference which is coaxial to the first circumference and has a radius substantially the same as the radius of the first circumference.

Preferably, the plurality of holes are arranged at regular intervals on the first circumference; wherein a first angle between any two of the plurality of balls with respect to the rotational center is determined to be larger than a second angle multiplied by an integer but smaller than the second angle multiplied by the sum of the integer plus one; wherein the second angle represents the angle of each interval of the plurality of engaging holes, and wherein the integer is a positive number.

The second angle is determined by the following equation:

$$p = P \times N + P/n$$

wherein
"p" represents the first angle,
"P" represents the second angle,
"N" represents the integer, and
"n" represents the number of the plurality of balls, the integer being positive.

Preferably, the rotatable member is a shutter speed dial for at least selecting a desired shutter speed among a predetermined plurality of shutter speeds.

Preferably, the select dial further includes a detector for detecting which one of the plurality of click-stop positions the rotatable member has stopped at. Preferably, the detector includes: a code disk on which predetermined conductive coding lands are formed; and an electrical brush slidably contacting with the conductive coding.

According to another aspect of the present invention, there is provided a select dial which includes a rotatable member and a click-stop mechanism for making the rotatable member stop with a click at any one of a plurality of click-stop positions when the rotatable member is rotated. The click-stop mechanism includes: a positioning member having a series of holes arranged at regular intervals on a circumference about a rotational center of the rotatable member to determine the plurality of click-stop positions; and at least two balls which are pressed against the positioning member and positioned relative to the positioning member so that one of the at least two balls is disengaged from any of the series of holes when another one of the at least two balls is engaged with any one of the series of holes.

Preferably, the positioning member is fixed to either the rotatable member or a stationary portion of the camera body.

The present disclosure relates to subject matter contained in Japanese Patent Application No. 10-110945 (filed on Apr. 21, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
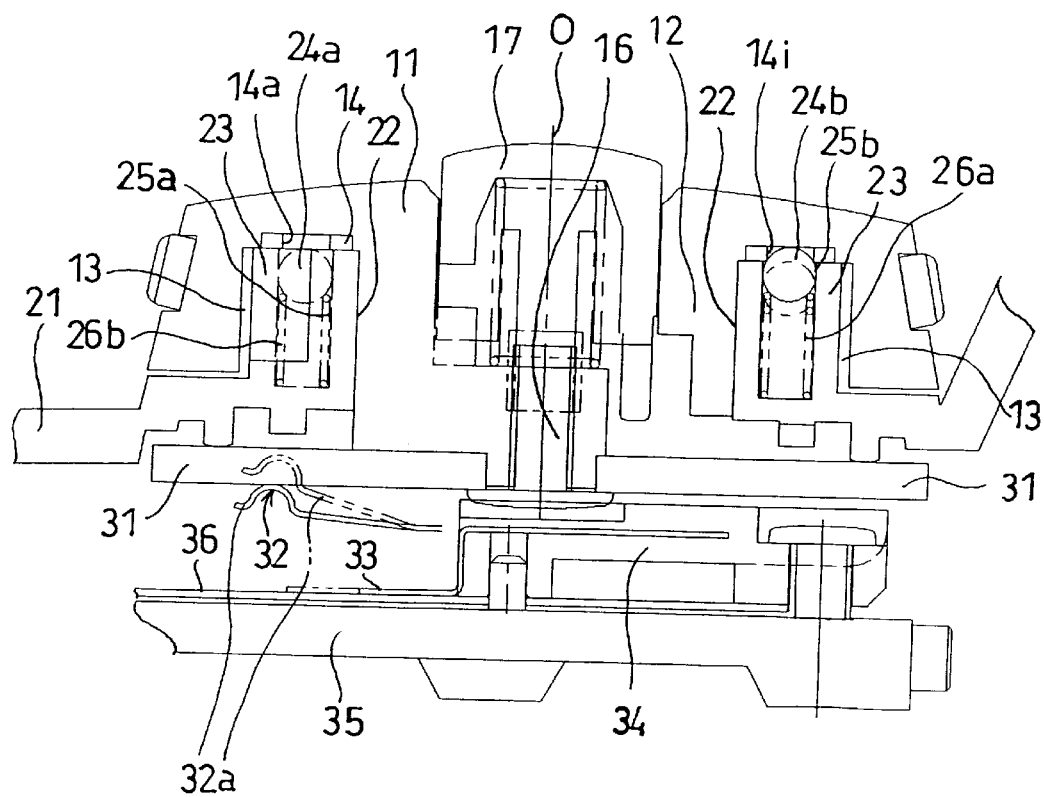
FIG. 1 is a cross-sectional view of an embodiment of a select dial of a camera to which the present invention is applied, taken along the line I—I shown in FIG. 2.
Figure 2:
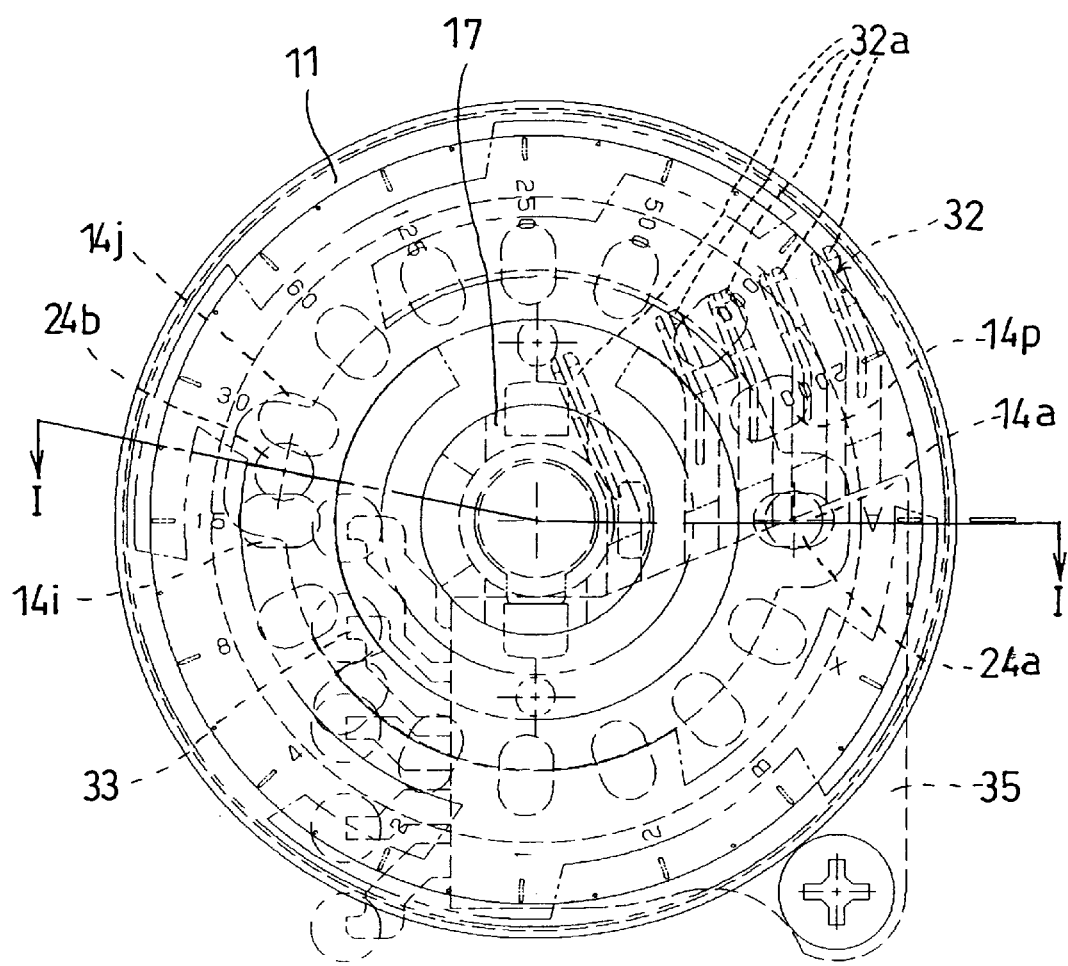
FIG. 2 is a plan view of the select dial shown in FIG. 1.

FIGS. 1 and 2 show an embodiment of a select dial of a camera. This select dial is provided with a shutter speed dial (i.e., a rotatable member) 11 which is operated to select a desired shutter speed among a predetermined number of shutter speeds or a desired shutter speed mode (auto shutter speed mode, bulb mode or x-sync mode). The shutter speed dial 11 is provided on an upper part of a camera body.

The shutter speed dial 11, provided as a rotatable member, is provided at a center thereof with a cylindrical portion 12 which extends inwardly to be rotatably fitted in a bearing hole 22 formed on an upper decorative plate 21 of the camera body, so that the shutter speed dial 11 is rotatable about the cylindrical portion 12. The upper decorative plate 21 is provided thereon with a boss 23, and the bearing hole 22 is formed on the boss 23 therethrough.

As shown in FIG. 2, on the upper face of the shutter speed dial 11, a series of numerical numbers ("2000", "1000", "500", "250", etc.) which represent reciprocals of shutter speeds (1/2000, 1/1000, 1/5000, 1/250, etc.) and also letters "A", "B" and "X" are printed on the upper face of the shutter speed dial 11. The letters "A", "B" and "X" represent the auto shutter speed mode, the bulb mode and the X-sync mode. There is provided a conventional lock-release button 17 at the center of the shutter speed dial 11. When the shutter speed dial 11 is positioned at a specified rotational position, e.g., at the rotational position to select the auto shutter speed mode "A", the shutter speed dial 11 cannot be rotated out of the specified rotational position unless the lock release button 17 is depressed.

A code disk 31 is secured to the inner end surface of the cylindrical portion 12, which extends inwardly through the bearing hole 22 to be positioned in the camera body. The code disk 31 is secured to the inner end surface of the cylindrical portion 12 by means of a set screw 16 so that the cylindrical portion 12 may not come out of the bearing hole 22. The code disk 31 is provided on a lower face thereof with conductive coding lands (not shown) formed in a predetermined pattern to be concentrically arranged about the rotational center of the code disk 31. An electrical brush 32, which is fixed to the brush supporting member 34, slidably contacts with the conductive coding lands of the code disk 31. A detector for detecting which one of a plurality of click-stop positions the shutter speed dial 11 has stopped at is composed of the conductive coding lands of the code disk 31 and the electrical brush 32. The brush supporting member 34 is secured to a frame 35 fixed to the camera body, so that the electrical brush 32 is fixed with respect to the camera body via the brush supporting member 34 and the frame 35. The electrical brush 32 has a plurality of leaf portions 32a which correspondingly come into contact with the conductive coding lands of the code disk 31. Each leaf portion 32a is electrically connected to an electrical circuit (e.g., a CPU) via a printed circuit board 36.

The contacting combination of the leaf portions 32a with the conductive coding lands of the code disk 31 varies depending upon the rotational position of the shutter speed dial 11 with respect to the camera body. The electrical circuit is constructed so that a shutter speed (or a shutter speed mode) can be selected which corresponds to the detected combination of the leaf portions 32a with the conductive coding lands of the code disk 31. The electrical brush 32 is electrically connected to the printed circuit board 36 via a leading member 33. In FIG. 1 the brush 32 and the leading member 33 are shown at the same rotational position about the rotational center O for the purpose of illustration.

The present embodiment of the select dial is provided with a click-stop mechanism wherein the select dial rotates stepwise so as to make the select dial stop at any one of the predetermined rotational positions thereof which correspond to the contacting positions of the electrical brush 32 with the conductive coding lands of the code disc 31. The structure of the click-stop mechanism will be hereinafter discussed in detail.

Figure 3:
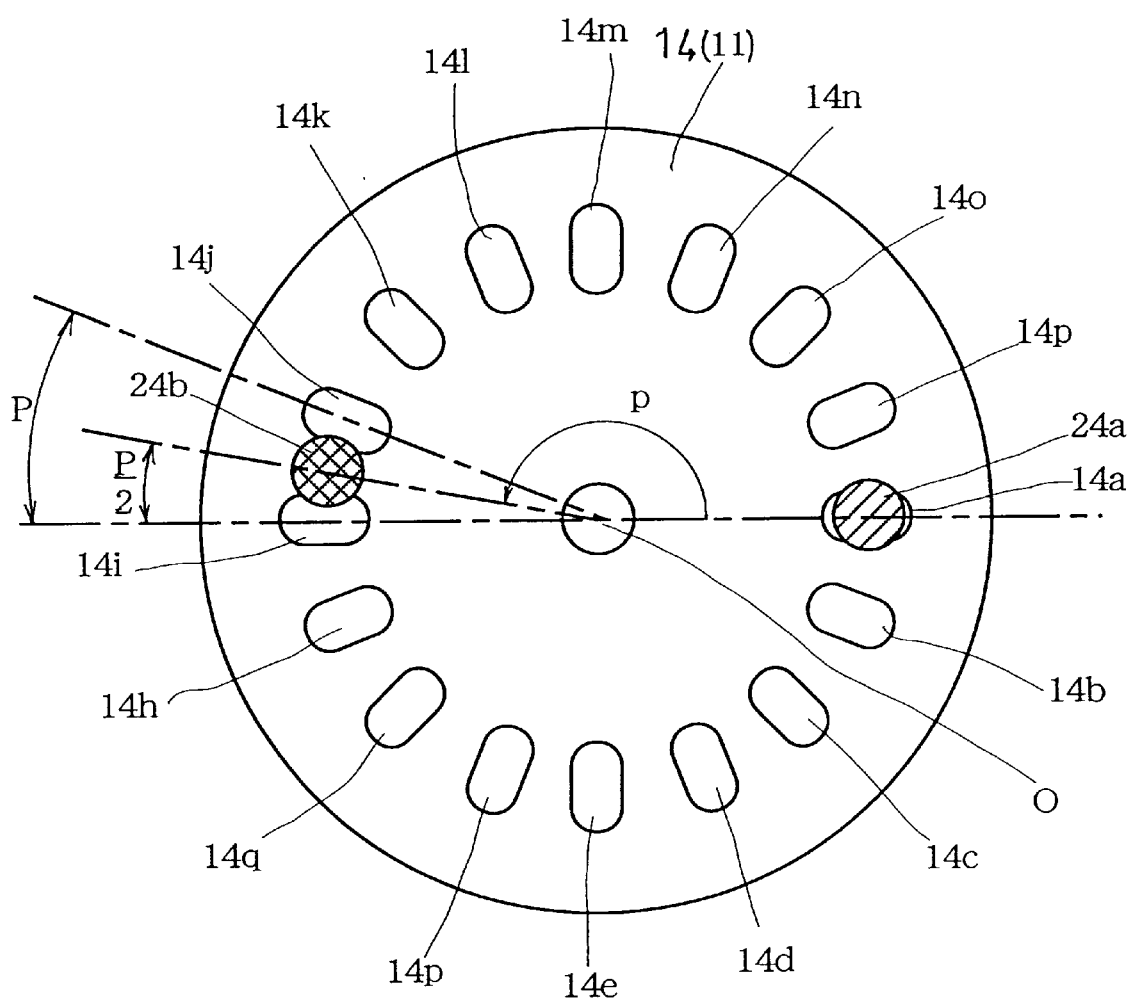
FIG. 3 is an explanatory view for illustrating an operation of the click-stop mechanism of the select dial.

The shutter speed dial 11 is provided on a lower face thereof with an annular groove 13 in which the boss 23 is fitted. A ring plate (positioning member) 14 is secured to the shutter speed dial 11 at the bottom of the annular groove 13. As shown in FIG. 2, the ring plate 14 is provided thereon with sixteen engaging holes 14a through 14p which are arranged at regular intervals along a circumference of the ring plate 14. In FIG. 3 the angle of each step or pitch (i.e., angle of step) of the engaging holes 14a through 14p is represented by "P" (P=22.5°). The angle of step P is represented by an internal angle made by two straight lines; one line passes the center of one engaging hole and the rotational center O of the shutter speed dial 11 while the other line passes the center of an adjacent engaging hole and the rotational center O. The ring plate 14 is made of a material whose hardness is greater than that of the material of the shutter speed dial 11 to add strength to the circular edge of each engaging holes on the ring plate 14.

Two vertical holes 25a and 25b in which two coil springs 26a and 26b are respectively positioned are formed on the boss 23. Two steel balls 24a and 24b are positioned in the vertical holes 25a and 25b on the upper ends of the coil springs 26b and 26a, respectively, so as to be held between the ring plate 14 and the coil springs 26b and 26a. The steel balls 24a and 24b are always pressed against the ring plate 14 by the coil springs 26b and 26a, respectively. Namely, each of the steel balls 24a and 24b is always forced in a direction to be engageable with any one of the engaging holes 14a through 14p.

Figure 4:
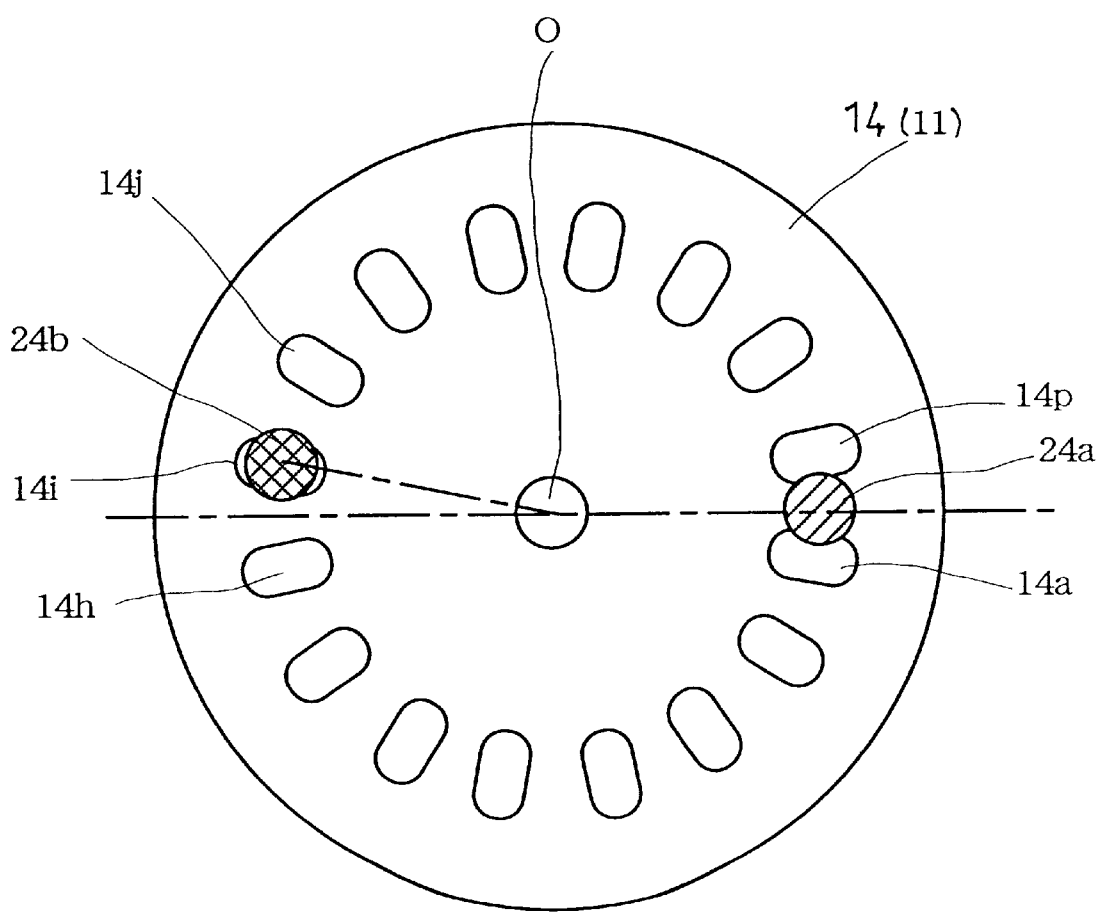
FIG. 4 is an explanatory view for illustrating an operation of the click-stop mechanism of the select dial.

As can be seen in FIGS. 3 and 4, the two steel balls 24a and 24b are arranged such that one of the two steel balls 24a or 24b is positioned between two adjacent holes of the engaging holes 14a through 14p when the other steel ball 24a or 24b is engaged with any one of the engaging holes 14a through 14p. In a particular case shown in FIG. 3, the steel ball 24a is engaged with the engaging hole 14a while the steel ball 24b is not engaged with any engaging hole but is positioned between the engaging holes 14i and 14j. In FIG. 3, the angle between the steel balls 24a and 24b with respect to the rotational center O of the shutter speed dial 11 is represented by "p" (p=168.75°). Accordingly, the angle p is determined so as not to be equal to a multiple of the aforementioned angle of step P. In this particular embodiment, the angle p is determined to be the sum of a multiple of half the angle of step P (i.e., a multiple of 11.25). Due to this structure, each time the shutter speed dial is rotated by a half of the angle of step P, the steel balls 24a and 24b are alternately engaged with any one of the engaging holes 14a through 14p. It should be noted that the angle p represents the smaller angle from the steel ball 24a to the steel ball 24b in either the clockwise or counterclockwise direction (counterclockwise in FIG. 3) about the rotational center O of the shutter speed dial 11, and does not refer to the larger angle thereof.

Due to the aforementioned structure wherein the angle p is determined to be the sum of a multiple of half the angle of step P, the number of click-stop positions of the shutter speed dial 11 is successively doubled with respect to the number of engaging holes 14a through 14p without increasing the number thereof.

The operation of the shutter speed dial 11 will be hereinafter discussed with reference to FIGS. 3 and 4. In a state shown in FIG. 3, the shutter speed dial 11 is positioned at a rotational position (first stop position) at which the steel ball 24a is engaged with the engaging hole 14a while the steel ball 24b is positioned between the two engaging holes 14i and 14j. In this state the steel ball 24b is not biased towards either engaging hole 14i or 14j, so that the steel ball 24b is in a neutral state wherein the steel ball 24b can be engaged with either engaging hole 14i or 14j once the shutter speed dial 11 is rotated clockwise or counterclockwise by the angle of P/2.

In the state shown in FIG. 3, rotating the shutter speed dial 11 clockwise by the angle of P/2 causes the steel ball 24a to come out of the engaging hole 14a to be positioned between the two engaging holes 14a and 14p and at the same time causes the steel ball 24b to be engaged with the engaging hole 14i with a click, so that the shutter speed dial 11 is positioned at a rotational position (second stop position) shown in FIG. 4.

Further rotating the shutter speed dial 11 clockwise by the angle of P/2 causes the steel ball 24a to be engaged with the engaging hole 14p and at the same time causes the steel ball 24b to come out of the engaging hole 14i to be positioned between the two engaging holes 14h and 14i accompanied with a click. Accordingly, each time the shutter speed dial 11 is rotated by a half of the angle of step P, the steel balls 24a and 24b are alternately engaged with any one of the engaging holes 14a through 14p. Namely, the angle of each step of the shutter speed dial 11 is identical to a half of the angle of step P, so that the shutter speed dial 11 can be selectively positioned at thirty-two different click-stop positions, which is double the number of engaging holes 14a through 14p.

The angle p between the two engaging balls 24a and 24b is determined to be larger than the angle of P multiplied by an integer N but smaller than the angle of P multiplied by N plus 1 (one), wherein N is a positive integer.

The angle p can also be determined by the following equation:

$$p = P \times N + P/n$$

wherein "n" represents the number of steel balls (n is a positive integer). In the present embodiment n is two.
In the present embodiment,
   P=360°/16=22.5°,
   N=7, and
   n=2.
Therefore, p=22.5°×7+22.5°/2=168.75.

In the present embodiment, since n is equal to 2, the angle of each step of the shutter speed dial 11 is identical to a half of the angle of step P, so that the shutter speed dial 11 can be selectively positioned at thirty-two different click-stop positions, the number of which is double the number of engaging holes 14a through 14p. In the case where the number of steel balls is three, i.e., n is equal to three, the angle of each step of the shutter speed dial 11 will be identical to one third of the angle of step P, so that the shutter speed dial 11 can be selectively positioned at forty-eight different click-stop positions, the number of which is three times the number of engaging holes 14a through 14p. In this case, it is of course necessary to modify the design of the conductive coding pattern formed on the code disk 31 and the electrical brush 32 to correspond to the increased number of click-stop positions.

Although the present invention is applied to the shutter speed dial of a camera, the present invention can be applied to any other dial of a camera such as a photographic mode selecting dial or a function mode selecting dial.

Although the steel balls 24a and 24b are used in the click-stop mechanism of the dial 11 in the present embodiment, the balls can be made of any other material such as ceramic or plastic material. The shape of each engaging hole 14a through 14p can also be modified.

The number of the steel balls used in the click-stop mechanism can be more than two. For instance, three steel balls each corresponding to the steel ball 24a can be arranged at regular intervals about the rotational center O while another three steel balls each corresponding to the steel ball 24b can be arranged at regular intervals about the rotational center O. Accordingly, the shutter speed dial 11 will be uniformly pressed upwards by those six steel balls in a direction parallel to the rotational axis O.

In the illustrated embodiment, although the engaging holes 14a through 14p are formed on the shutter speed dial (rotatable member) 11 while the steel balls 24a and 24b are positioned on the boss (stationary member) 23 fixed to the camera body, the engaging holes 14a through 14p can be formed on the stationary member while the steel balls 24a and 24b can be positioned on the operational disk member. In this case, a member which corresponds to the ring plate 14 can be secured to, or integrally formed with, the stationary member.

In the illustrated embodiment, although the engaging holes 14a through 14p and the steel balls 24a and 24b are arranged to be engageable with one another in a direction parallel to the rotational axis O, the engaging holes and the steel balls can be arranged to be engageable with one another in a radial direction about the rotational axis O.

In the illustrated embodiment, although the plurality of engaging holes 14a through 14p are formed on the ring plate 14 fixed to the shutter speed dial 11 at the bottom of the annular groove 13, the plurality of engaging holes 14a through 14p can be formed directly on the shutter speed dial 11 along the bottom of the annular groove 13, or the ring plate 14 can be integrally formed with the shutter speed dial 11.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A select dial of a camera which includes a rotatable member and a click-stop mechanism for making said rotatable member stop with a click at any one of a plurality of click-stop positions of said rotatable member when said rotatable member is rotated, said click-stop mechanism comprising:

a positioning member having a plurality of holes which determine said plurality of click-stop positions; and a plurality of balls each being pressed against said positioning member to be engageable with any one of said plurality of holes;

wherein said plurality of holes and said plurality of balls are arranged so that one of said plurality of balls is disengaged from any of said plurality of holes when another ball of said plurality of balls is engaged with any one of said plurality of holes.

2. The select dial according to claim 1, wherein said rotatable member is rotatable about a shaft supported by a stationary member of a camera body.

3. The select dial according to claim 2, wherein said shaft is integrally formed with said rotatable member.

4. The select dial according to claim 2, wherein said positioning member is fixed to said rotatable member.

5. The select dial according to claim 4, wherein said positioning member is integrally formed with said rotatable member.

6. The select dial according to claim 2, wherein said positioning member is fixed to said stationary member.

7. The select dial according to claim 6, wherein said positioning member is integrally formed with said stationary member.

8. The select dial according to claim 4, wherein said plurality of holes are positioned on a first circumference about a rotational center of said rotatable member, and wherein said plurality of balls are positioned on said stationary member to be engageable with any one of said plurality of holes.

9. The select dial according to claim 8, wherein said plurality of balls are positioned on a second circumference which is coaxial to said first circumference and has a radius substantially the same as the radius of said first circumference.

10. The select dial according to claim 6, wherein said plurality of holes are positioned on a first circumference about a rotational center of said rotatable member, and wherein said plurality of balls are positioned on said rotatable member to be engageable with any one of said plurality of holes.

11. The select dial according to claim 10, wherein said plurality of balls are positioned on a second circumference which is coaxial to said first circumference and has a radius substantially the same as the radius of said first circumference.

12. The select dial according to claim 8, wherein said plurality of holes are arranged at regular intervals on said first circumference;

wherein a first angle between any two of said plurality of balls with respect to said rotational center is determined to be larger than a second angle multiplied by an integer but smaller than said second angle multiplied by the sum of said integer plus one;

wherein said second angle represents the angle of each interval of said plurality of engaging holes, and wherein said integer is a positive number.

13. The select dial according to claim 12, wherein said second angle is determined by the following equation:

$$p = P \times N + P/n$$

wherein

"p" represents said first angle,

"P" represents said second angle,

"N" represents said integer, and

"n" represents the number of said plurality of balls, said integer being positive.

14. The select dial according to claim 10, wherein said plurality of holes are arranged at regular intervals on said first circumference;

wherein a first angle between any two of said plurality of balls with respect to said rotational center is determined to be larger than a second angle multiplied by an integer, but smaller than said second angle multiplied by the sum of said integer and one;

wherein said second angle represents the angle of each interval of said plurality of engaging holes; and wherein said integer is positive.

15. The select dial according to claim 14, wherein said second angle is determined by the following equation:

$$p = P \times N + P/n$$

wherein

"p" represents said first angle,

"P" represents said second angle,

"N" represents said integer, and

"n" represents the number of said plurality of balls, said number being a positive integer.

16. The select dial according to claim 1, wherein said rotatable member is a shutter speed dial for at least selecting a desired shutter speed among a predetermined plurality of shutter speeds.

17. The select dial according to claim 16, further comprising a detector for detecting which one of said plurality of click-stop positions said rotatable member has stopped at.

18. The select dial according to claim 17, wherein said detector comprises:

a code disk on which predetermined conductive coding lands are formed; and an electrical brush slidably contacting with said conductive coding.

19. A select dial including a rotatable member and a click-stop mechanism for making said rotatable member stop with a click at any one of a plurality of click-stop positions when said rotatable member is rotated, said click-stop mechanism comprising:

a positioning member having a series of holes arranged at regular intervals on a circumference about a rotational center of said rotatable member to determine said plurality of click-stop positions; and at least two balls which are pressed against said positioning member and positioned relative to said positioning member so that one of said at least two balls is disengaged from any of said series of holes when another one of said at least two balls is engaged with any one of said series of holes.

20. The select dial according to claim 19, wherein said positioning member is fixed to said rotatabe member.

21. The select dial according to claim 19, wherein said positioning member is fixed to a stationary portion.

* * * * *